Patented Dec. 14, 1948

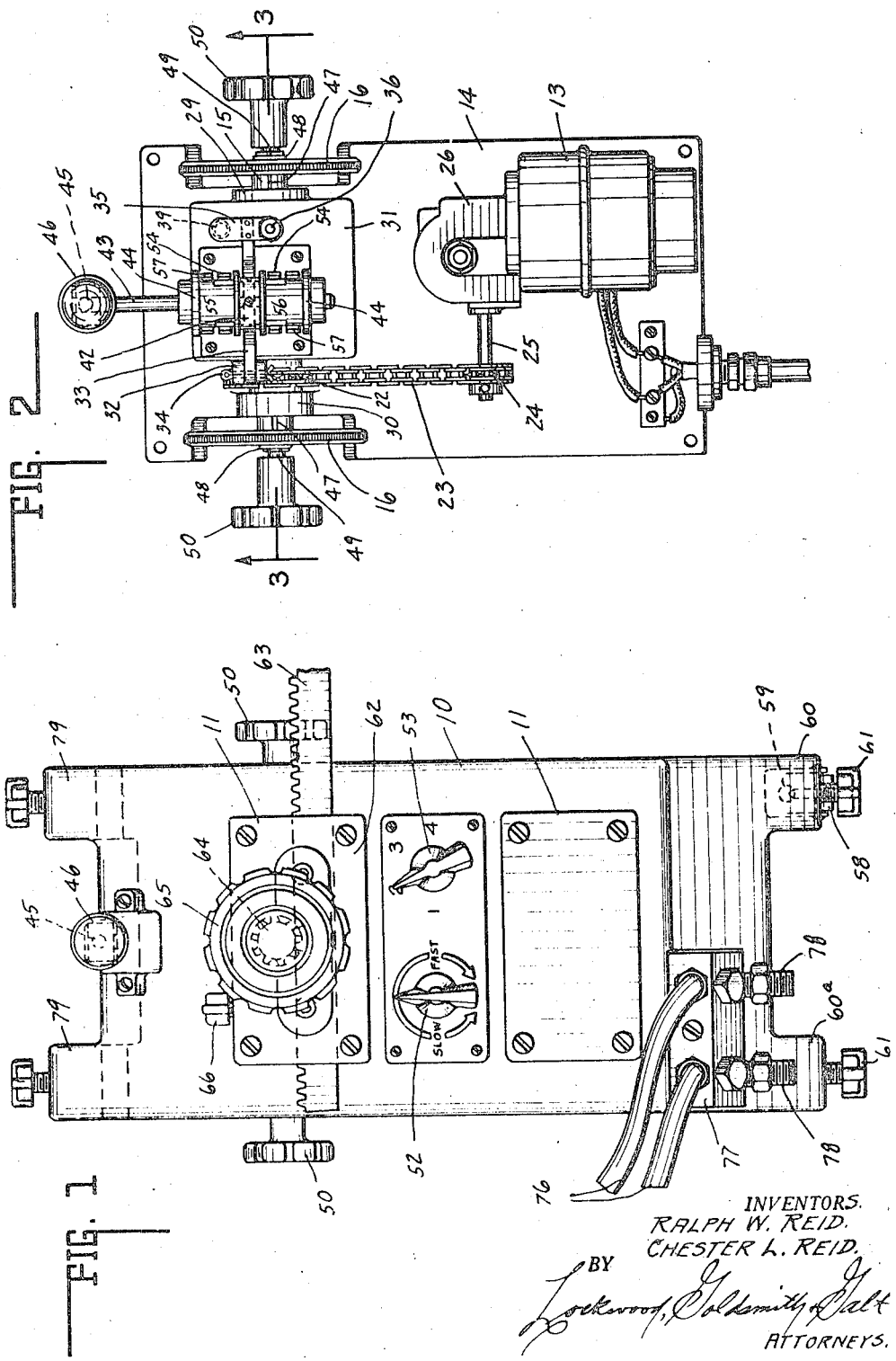

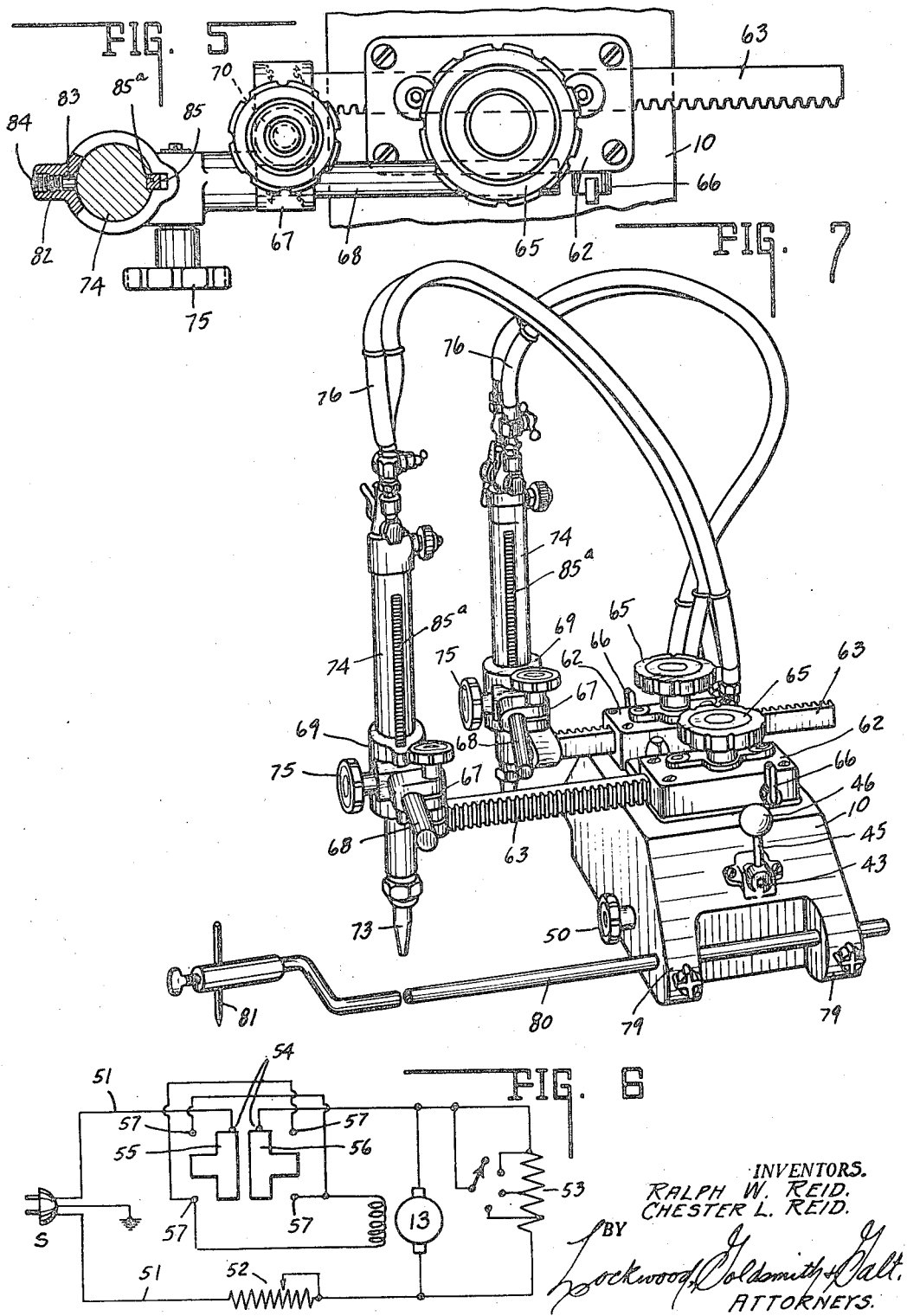

2,456,444

UNITED STATES PATENT OFFICE 2,456,444

ELECTRIC MOTOR POWERED WHEEL DRIVE AND CONTROL FOR TOOL CARRIAGES

Ralph W. Reid and Chester L. Reid, Indianapolis, Ind., assignors to John R. Brant, Indianapolis, Ind.

Application July 12, 1945, Serial No. 604,688

6 Claims. (Cl. 180—65)

This invention relates to a carriage for flame cutters or similar devices requiring a wide working range with accurate positioning and traction, such as welders, paint spray nozzles and similar tools.

One feature of the invention resides in that part of the carriage comprising the tractor which supports the tools and cross action assembly therefor to be electrically driven in precise predetermined paths and distances to direct the tool in its operation.

One advantage of the mechanism herein disclosed resides in the single manual control of the tractor for starting and stopping it at an exact location without overrun due to inertia of the driving motor or other parts. Thus, upon the control lever being thrown to the stopping position, the tractor will be immediately arrested so as to prevent overrunning of the tool beyond a predetermined limit of operation. This is accomplished by combining the motor control and a positive driving clutch in such manner that in stopping the tractor the driving motor will first be declutched from the traction wheels to permit overrun of the motor while permitting the tractor to be immediately arrested through frictional resistance. On the other hand, in throwing the operating handle to the starting position it will first energize the motor and permit it to get under way immediately prior to clutching the drive so that a positive starting action is obtained.

Another feature of the invention resides in the construction of the tractor, particularly with respect to the mounting of the driving wheels in such manner that they may be individually connected or disconnected with respect to the driving force to provide a differential drive, whereby one wheel will be driven and the other permitted to idle as when the tractor is to move in a curved or circular path.

A further feature of the invention resides in the construction of the carriage whereby the tractor housing provides adaptor mountings for receiving the cross section assembly for various tools, or different assemblies of tools. By means of this arrangement, the tractor may be adapted for use in various types of work to direct the work through paths of predetermined length and direction.

Still a further feature of the invention resides in that part of the carriage comprising a swivel tool support for tools of different character to permit of accurate positioning in the mounting thereof.

Still a further feature of the invention resides in that part of the carriage comprising the arrangement of the gas manifold on the tractor when used in connection with a torch cutting tool.

The full nature of the invention will be understood from the accompanying drawings and the following description and claims:

Fig. 1 is a plan view of the tractor with a portion of one cross head assembly shown mounted thereon.

Fig. 2 is a plan view of the face of the tractor.

Fig. 5 is the same as Fig. 4, showing a plan view thereof.

Fig. 6 is a wiring diagram of the electric control.

Fig. 7 is a perspective view of the carriage with dual cross head assemblies.

Figure 3:
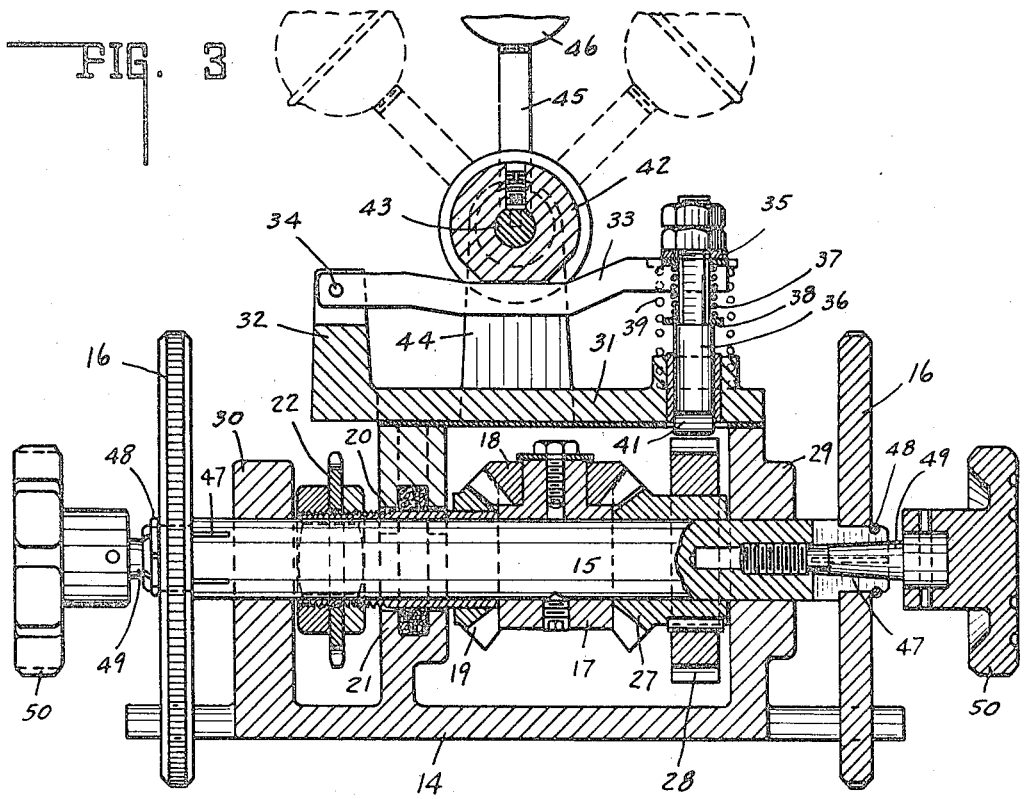
Fig. 3 is a central vertical section through the driving axle assembly with parts in elevation, and in association with the control handle.

In the drawings there is illustrated a carriage for manipulating a tool including a tractor having a housing 10 and a fitting 11 carried by said tractor for mounting a cross head assembly to support a tool in the manner hereinafter described. As shown herein, by way of example, the carriage is adapted to mount a flame cutting torch in the manner illustrated in Fig. 7. However, other tools may be supported by the carriage in the manner of the torch to be accurately directed in a prescribed path within predetermined limits.

Mounted within the housing of the tractor, as best illustrated in Fig. 2, there is an electric driving motor 13 supported upon the base plate 14, which base plate is adapted to be secured to the underside of the housing 10 by suitable screws for enclosing the motor 13 and associated driving mechanism. Supported upon the plate 14 there is a front axle assembly, as shown in Fig. 3, which includes a horizontally-disposed driving shaft 15, carrying at opposite ends thereof the traction wheels 16. Keyed to said shaft intermediate the ends thereof for rotation therewith, there is provided a collar 17 upon which there is a bevel pinion 18 freely rotatable on the collar about an axis perpendicular to the axis of the shaft. Meshing with the pinion 18 there is a bevel gear 19 carried by the sleeve 20 rotatable about the shaft 15. Said sleeve is rotatably supported in the bearing support 21 carried by the base plate 14, with the gear 19 on one end thereof and a sprocket wheel 22 secured to the other end thereof. Said sprocket wheel is driven by a sprocket chain 23 from a sprocket wheel 24 keyed to a shaft 25. Said shaft 25 (Fig. 2) is driven by the motor 13 through the usual speed reduction gearing provided in the gear housing 26.

Mounted on the shaft 15 (Fig. 3) there is a bevel gear 27 meshing with the pinion 18 on the opposite side of the collar 17. Said gear carries a toothed wheel 28 which is keyed thereto for rotation therewith, said gear 27 and wheel 28 being normally free to rotate about the shaft 15. Said shaft 15 is supported adjacent its opposite ends and within the traction wheels 16 by the bearing supports 29 and 30 formed integral with and extending upwardly from the plate 14.

The front axle assembly is contained within a box-like housing having the plate 14 as its base and the bearing supports 21, 29 as its side walls to which a top plate 31 is rigidly secured. Mounted on the top plate 31 there is an upwardly extending boss 32 to which a laterally-extending actuating lever 33 is pivotally connected at 34. The free end of said lever carries a cross arm 35, one end of said cross arm actuating a holding pin in the form of a plunger 36 through the medium of a spring 37 mounted between the cross arm and the shoulder 38 on the plunger 36. The opposite end of said cross arm is yieldingly supported in its raised position while permitting depression thereof by a spring 39 positioned between the top plate 31 and said cross arm.

The holding pin or plunger 36 is depressible through a bearing in the plate 31, and is provided with a flat reduced tooth 41 positioned and arranged to engage the peripheral teeth of the toothed wheel 28. The actuating lever 33 is engaged by a cam surfaced control drum 42, keyed to rotate with a supporting spindle 43 carried by a pair of spaced brackets 44 extending upwardly from the top plate 31. One end of the spindle 43 carries an upwardly extending operating handle 45 upon which there is provided a knob 46. The control drum 42 is provided with reduced flats engageable with the actuating lever 33 and so formed that when the control lever 45 is in its central position the flat face of the drum engaging the lever permits spring 39 to elevate the lever sufficiently to raise the plunger 36 upwardly free of the toothed wheel 28. When the operating lever 45 is moved to the left or right of center position, the flat cam faces of the control drum depresses the lever 33 which forces the clutch pin downwardly into interlocking engagement with the teeth of the toothed wheel 28 against the tension of the spring 37.

In operation, the front axle assembly carrying the traction wheels is driven by the motor 13 when the knob 46 is moved to the left or the right positions, one forwardly and one reversed, as hereinafter described. In the central position of the knob 46 the drive is disconnected so that the motor 13 is permitted to overrun while the traction wheels immediately stop, due to their frictional resistance. During operation of the motor the sprocket 22, bevel gear 19, and pinion 18 are rotated, the pinion 18 rotating about its mounting on collar 17. When the plunger 36 is moved out of engagement with the toothed wheel 28, the knob 46 being moved to center position, said gear 27 and toothed wheel 28 are freely rotatable about the shaft 15 during overrun of the motor which, with the traction wheels, will cease to rotate. But upon the kob being moved to either side of its center position to depress the plunger 36, the toothed wheel 28 is locked against rotation, which holds the bevel gear 27 stationary while the pinion 18 is being rotated. This causes the pinion 18 to rotate about the stationary bevel gear 27 and carry with it the collar 17 which is keyed to the shaft 15. Such rotation of the pinion and collar, therefore, rotates the shaft which in turn drives the traction wheels 16.

The ends of the shaft 15 are internally tapered and slotted as indicated at 47 to frictionally engage the traction wheels which are locked thereon by the locking rings 48. Such split ends of the shaft are provided with internal tapered and threaded bores to receive the tapered pins 49 having threaded engagement within the bore, and to each of which a knob 50 is secured. By manipulating one or the other of the knobs 50 the split ends of the shafts may be expanded into locking engagement with the respective traction wheels 16 or permitted to contract so that said wheels will freely rotate relative to the shaft.

By means of this arrangement the traction wheels may be locked to the shaft to be driven thereby, may be entirely freed therefrom or frictionally engaged therewith to varying degrees. This permits the traction wheels to be controlled for dual drive, free wheeling or by locking one and freeing the other, permitting of differential drive therebetween when the tractor is to be driven in a curved or circular path.

The electric motor 13 is connected to a suitable source of electric current S by the lines 51. The motor is of reversible type and is connected with the source through a speed control rheostat 52. The circuit is further provided with a four speed armature shunt resistor 53. Included in the motor circuit is a series of contact brushes 54 connecting opposite sides of the circuit with the respective contact plates 55, 56 mounted on the control drum to rotate with the spindle 43. The circuit is closed in the selected direction of motor drive by turning the drum in such direction as to move contact plate 55, 56 into contact with brushes 57. Said contact plates are so spaced and arranged relative to the brushes 57 that when in their central or neutral position, with the knob 46 extending upwardly, the contact is broken. In this position with the circuit to the motor broken, the control drum 42 has permitted the lever 33 to be elevated which, as above described, disconnects the driving axle assembly from drive by the motor driven sprocket 22. When the control knob 46 is moved to the left, as shown in Fig. 3 by dotted lines, spindle 43 is rotated thereby to first make contact through the brushes 57 to close that circuit through the motor 13 which starts it up in the forward drive direction. This is followed by the control drum 42 interlocking the plunger 36 and gear wheel 28 to cause the motor driven sprocket 22 to drive the traction wheels 16 in the forward direction.

Upon the knob 46 being swung to its neutral or central position, it first causes disengagement of the clutch pin and toothed wheel 28 so that the front axle drive is disconnected and the tractor is immediately brought to rest due to the frictional resistance of its driving parts. Thereupon, the contact plates are moved out of contact with the brushes 57 so that the circuit to the motor is broken and the motor comes to rest while permitting free overrun of its driving connection with the sprocket wheel 22 without imparting any motion to the tractor.

Upon swinging the control knob 46 to the opposite side, or to the right as shown in Fig. 3 by dotted lines, the circuit to the motor is first closed through the reverse circuit, causing the sprocket 22 to be driven in the reverse direction. This is followed by forcing the plunger into locking engagement with the toothed wheel 28 to impart the reverse drive action to the front axle assembly and cause the tractor to move in a reverse direction.

The rear end of the tractor is supported by one or more caster wheels 58 adapted to swivel on a pintle 59 extending upwardly in a bearing in one or both of the boss portions 60, 60a arranged to be locked in adjustable position by the hand nut 61, or, when desired, permitted to freely swivel. In most cases, only one caster is used, but when desired a second caster may be similarly mounted in the boss 60a. Thus, that end of the tractor opposite the traction wheels is supported in a manner to permit the tractor to swing about a curved or circular path.

Figure 4:
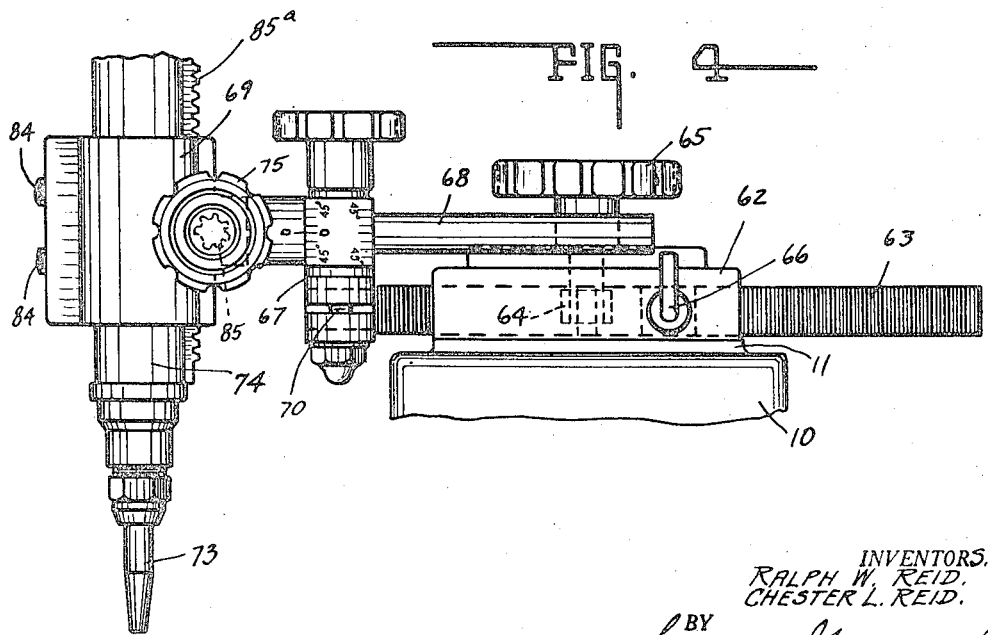
Fig. 4 is a side elevation showing that part of the carriage comprising a cross head assembly for supporting a tool.

The tool carriage, in addition to the tractor above described, includes various cross head assemblies or fittings, one or more of which may be removably mounted upon the top of the housing 10. For this purpose the housing is provided with spaced boss sections to receive the mounting plates 62. As shown in Fig. 1, the mounting plate 62 carries a rack bar 63 extending longitudinally of the plate and slidable therein, controlled by a pinion indicated at 64 rotatable by a hand wheel 65 and adapted to be locked in place by a lock nut 66. The rack bar 63 is arranged to carry at one end thereof a tool swivel block 67, as shown in Fig. 4, having a lower clamping head secured to the end of the rack bar 63 and an upper clamping head for clamping an arm 68 carrying the tool holder 69. The swivel block is rotatably adjustable with respect to the rack bar 63 and the lower and upper clamping heads thereof are rotatable relative to each other about their connecting spindle 70. The arm of the tool holder 69 is rotatable in the upper head. Any desired tool may be carried by the tool holder 69 and adjustably secured therein, such a tool being herein shown as a torch 73 provided on the lower end of the cylindrical nozzle 74. The barrel may be raised or lowered within the holder by the adjusting knob 75.

The torch barrel, as illustrating one type of tool, is connected in the usual manner by the gas hose 76 leading to a manifold block 77 having intake conduits 78. Said manifold block is seated within a suitable recess formed at one end of the tractor housing 10.

As shown in Fig. 1, only one tool mounting 62 is carried upon the housing 10, while in Fig. 7 a second mounting is illustrated as being secured over the other fitting 11. At that end of the housing 10 adjacent the traction wheels there is formed a pair of outwardly extending boss portions 79 having aligned holes therein for receiving a radius rod 80 for a compass attachment which may be used to center the tractor when it is desired to direct it in a circular path having its center at the point indicated by the needle 81.

From the foregoing it will be observed that the movement of the carriage is controlled by a single master control lever comprising the spindle 43, handle 45 and knob 46, which affords the operator regulated control of both the mechanical drive of the front axle assembly and electrical control of the motor, thereby eliminating the necessity of a plurality of controls for starting and stopping the motor, reversing the motor and operating the front axle drive. This arrangement permits the operator to manipulate the tractor with one hand, allowing the other hand to be free for other essential operations. Also, the drive may be a dual traction wheel straight drive, as when the knobs 50 are tightened or of a differential drive, permitting one traction wheel to run free when one of the knobs 50 is loosened.

Through provision of the fittings 11 on top of the housing, a single or dual cross head assembly may be conveniently provided. When applied to a torch cutting tool, the tool holder 69 may be raised or lowered by the knob 75 to varying positions, and corrected for varying sizes and shapes of barrels. Whereas the normal types of holders are split to compensate for the differences in diameter of the torch barrels, it results that when thus adjusted it tends to change its shape to an elliptic. However, the holder 69 is not split and, therefore, holds its shape without bending or changing its shape to an elliptic.

Thus, the adjustment to different sized barrels is automatically accomplished through the aid of the springs 82 urging a pair of spaced plugs 83 into frictional contact with the barrel under spring tension controlled by the set screws 84. The friction plugs 83 are positioned directly opposite the height control pinion 85 engageable with the height control rack 85a carried by the barrel and controlled by the knob 75. By this arrangement of holder, as distinguished from a split collar holder, the friction plugs 83 will permit smooth sliding movement of the barrel while holding it in the proper position within the holder and in respect to the pinion 85, irrespective of its size. This permits of smooth adjustment. A further advantage of this arrangement is the location of the control knob 75 in respect to the holder, whereby vibration of the torch when adjusting the barrel is eliminated or reduced to a minimum.

Whereas the machine has been shown and described as applied to a torch cutting carriage, it will be apparent that other tools may be substituted for the torch barrel, such as a welding head, a paint nozzle, or any other tool of similar character wherein it is desired to accurately control the path of movement thereof.

The invention claimed is:

1. In a tool carriage, a tractor unit including a driving shaft, a pinion secured to said shaft for bodily rotation therewith, said pinion being rotatable about an axis extending at right angles to the axis of said shaft, a pair of spaced gears freely rotatable about said shaft in meshing engagement with said pinion in opposed relation, means for driving one of said gears for rotating said pinion, a toothed wheel secured to the other of said gears, a plunger slidably mounted in said unit to move into and out of interlocking engagement with the teeth of said wheel, a spring normally retaining said plunger out of interlocking engagement, an actuating arm operatively connected with said plunger, and a manually actuated cam mounted on said unit engageable with said arm movable in one direction to effect engagement between said plunger and wheel to cause said pinion to be rotated relative thereto to rotate said shaft, and when moved to the other direction to effect disengagement of said plunger from said wheel to permit said pinion to rotate free of said shaft.

2. In a tool carriage, the combination with a tractor including a pair of traction wheels, a power transmission unit operable to drive said wheels, an electric motor, and a driving connection between said motor and unit, of an electric circuit connected with said motor, a contact drum for making and breaking said circuit, a cam associated with said drum, means controlled by said cam for rendering said unit inoperable to drive said wheels, and a single manually operable control connected with said drum movable to one position to close said circuit and move said cam therewith to render said power transmission unit inoperable and to another position to break said circuit and render said unit inoperable.

3. In a tool carriage, the combination with a tractor including a pair of traction wheels, a power transmission unit operable to drive said wheels, an electric motor, and a driving connection between said motor and unit, of an electric circuit connected with said motor, a contact drum for making and breaking said circuit, a cam associated with said drum, means controlled by said cam for rendering said unit operable and inoperable to drive said wheels, and a single manually operable control connected with said drum movable to one position to close said circuit and move said cam therewith to render said power transmission unit operable and to another position to break said circuit and move said cam therewith to render said unit inoperable, said drum and cam being so related as to cause said circuit to be closed before said transmission unit is rendered operable and to render said transmission unit inoperable and open said circuit.

4. In a tool carriage, the combination with a tractor unit including a pair of traction wheels, a drive shaft for said wheels, a collar secured to said shaft having a pinion rotatable thereon, and a pair of spaced gears about said shaft in meshing engagement with said pinion in opposed relation, of an electrically operated motor circuit for driving an electric motor connected to one of said gears to rotate said pinion, a plunger carried by said unit movable into and out of interlocking engagement with the other of said gears for rendering said pinion operative to rotate said shaft when in interlocking position while rendering said pinion inoperative when disengaged therefrom, an actuating drum having a cam surface operable to move said actuating pin into and out of interlocking engagement with said gear, contact switches in said circuit carried by said drum for making and breaking said circuit, and manually actuated means for rotating said drum to close said circuit and effect movement of said plunger to render said pinion operative to drive said shaft and movable to another position to effect movement of said plunger for rendering said pinion inoperative to drive said shaft and open said circuit.

5. In a tool carriage, the combination with a tractor unit including a pair of traction wheels, a drive shaft for said wheels, a collar secured to said shaft having a pinion rotatable thereon, and a pair of spaced gears about said shaft in meshing engagement with said pinion in opposed relation, of an electrically operated motor circuit for driving an electric motor connected to one of said gears to rotate said pinion, a plunger carried by said unit movable into and out of interlocking engagement with the other of said gears for rendering said pinion operative to rotate said shaft when in interlocking position while rendering said pinion inoperative when disengaged therefrom, an actuating drum having a cam surface operable to move said actuating pin into and out of interlocking engagement with said gear, contact switches in said circuit carried by said drum for making and breaking said circuit, and manually actuated means for rotating said drum to close said circuit and to effect movement of said plunger to engage and render said pinion operative to drive said shaft and movable to another position for effecting movement of said plunger out of engagement and rendering said pinion inoperative to drive said shaft and open said circuit, the cam portion of said drum and switches being so related as to first close said circuit and thereafter render said pinion operative to drive said shaft when moved to the first mentioned position and when moved to the second mentioned position render said pinion inoperative to drive said shaft and open said circuit.

6. In a tool carriage, the combination with a tractor including a pair of traction wheels, a power transmission unit for driving said wheels, an electric motor, and a driving connection between said motor and unit, of an electric circuit connected with said motor, a switch element in said circuit, means operable when moved to one position to render said power transmission unit operative and when moved to the opposite position to render said unit inoperative, and a single manually operable control member movable in one direction to first close said switch for closing the motor circuit and move said means to its first-mentioned position and movable in the opposite direction to first move said means to the second-mentioned position and thereafter open said switch to break the motor circuit.

RALPH W. REID.
CHESTER L. REID.

REFERENCES CITED

The following references are of record in the file of this patent:

UNITED STATES PATENTS

| Number | Name | Date |
|---|---|---|
| 187,929 | St. John | Feb. 27, 1877 |
| 439,395 | Fleischer | Oct. 28, 1890 |
| 631,437 | Plass | Aug. 22, 1899 |
| 665,594 | Brady | Jan. 8, 1901 |
| 1,179,407 | Decker | Apr. 18, 1916 |
| 1,309,085 | Coryell | July 8, 1919 |
| 1,527,247 | Bouillon | Feb. 24, 1925 |
| 1,731,548 | Starr | Oct. 15, 1929 |
| 1,941,184 | Oldham | Dec. 26, 1933 |
| 2,183,605 | Bucknam et al. | Dec. 19, 1939 |
| 2,207,447 | Viles et al. | July 9, 1940 |
| 2,253,540 | Stoneberg | Aug. 26, 1941 |
| 2,266,730 | Anderson et al. | Dec. 23, 1941 |
| 2,270,242 | Anderson | Jan. 20, 1942 |
| 2,311,223 | Geibig | Feb. 16, 1943 |
| 2,373,541 | Chelborg et al. | Apr. 10, 1945 |
| 2,389,585 | Anderson | Nov. 27, 1945 |
| 2,390,896 | Pelland, Jr. | Dec. 11, 1945 |
| 2,403,514 | Franzen | July 9, 1946 |

FOREIGN PATENTS

| Number | Country | Date |
|---|---|---|
| 21,913 | France | Apr. 9, 1921 |
| 597,167 | Germany | May 18, 1934 |